United States Patent [19]

Zimmardi

[11] Patent Number: 4,499,634
[45] Date of Patent: Feb. 19, 1985

[54] JEWELRY CLASP

[76] Inventor: Francesco P. Zimmardi, 4137 N. Murray Ave., Milwaukee, Wis. 53211

[21] Appl. No.: 485,967

[22] Filed: Apr. 18, 1983

[51] Int. Cl.³ .................. F16G 15/00; A44B 13/00
[52] U.S. Cl. ................. 24/116 A; 24/230.5 W; 24/241 SL; 24/616
[58] Field of Search ............ 24/3 R, 3 D, 3 J, 3 K, 24/616, 618, 116 A, 626, 230.5 W, 230.5 AD, 241 P, 241 PP, 241 PL, 241 PS, 241 SP; 63/4, 21; D11/11, 87

[56] References Cited

U.S. PATENT DOCUMENTS

| 718,768 | 1/1903 | Joslin | 24/230.5 W |
| 1,347,515 | 7/1920 | Lutz | 24/116 A |
| 2,143,703 | 1/1939 | Kestenman | 63/4 |
| 2,457,435 | 12/1948 | Beckman | 24/241 SL |
| 2,648,884 | 8/1953 | Loofboro | 24/303 |
| 2,986,792 | 6/1961 | Wyatt | 24/616 |
| 3,165,804 | 1/1965 | Marosy | D11/87 |
| 3,168,768 | 2/1965 | Bohlinger et al. | 24/116 A |
| 3,181,217 | 5/1965 | Bohlinger et al. | 24/116 A |
| 3,323,324 | 6/1967 | Bohlinger et al. | 24/116 A |
| 4,041,579 | 8/1977 | Chappel | D11/87 |

FOREIGN PATENT DOCUMENTS

| 910002 | 5/1946 | France | 24/616 |
| 204645 | 10/1923 | United Kingdom | 24/616 |

Primary Examiner—Victor N. Sakran
Attorney, Agent, or Firm—Ronald E. Barry

[57] ABSTRACT

A jewelry clasp having a main body formed by a pair of symmetrical members mounted in a parallel spaced relation to form a laminated structure, each member including a closed loop at one end and a partial loop at the other end, the closed loop being connected to one end of a decorative chain and the partial loop being detachably connected to the other end of the chain and a detent type latch assembly mounted on the main body for locking the other end of the chain on the partial loop.

8 Claims, 5 Drawing Figures 4,499,634

JEWELRY CLASP

BACKGROUND OF THE INVENTION

It is commonly understood that jewelry chains such as necklaces and bracelets are held together by means of disconnectable clasps. The clasp must provide a secure connection between the two ends of the necklace or bracelet but also have sufficient strength to withstand normal wear and tear without being excessively large. In this respect, the clasp must be designed so that it does not detract from the design of the chain. Many styles of clasps have been produced, however, the lock mechanisms of most of the clasps have still presented a problem to the user.

SUMMARY OF THE INVENTION

The clasp of the present invention has unique structural characteristics which increase the overall strength of the clasp. This has been accomplished by providing a unique body structure for the clasp without detracting from the aesthetic characteristics of the clasp. The clasp is provided with a unique double lock arrangement which minimizes the possibility of releasing from the chain in normal wear.

DETAILED DESCRIPTION OF THE INVENTION

Figure 1:
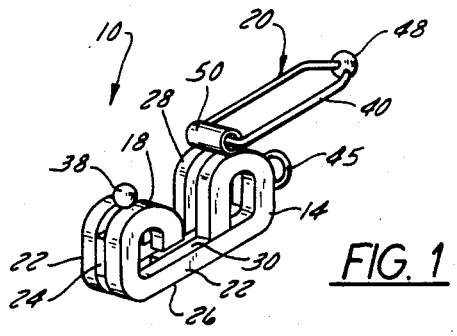
FIG. 1 is a perspective view of the jewelry clasp according to the present invention.

The clasp 10 according to the present invention is used to connect the ends of a chain 12. The clasp includes a main body or housing 14 which is provided with means in the form of a ring 45 for connecting one end of a chain 12 to the clasp and a second means in the form of a loop 18 for detaching or connecting the other end of the chain 12 to the clasp 10. The disconnectable end of the chain 12 is locked on the loop 18 by a lock means in the form of a latch assembly 20. With this arrangement the end of the chain is double locked on the clasp.

The main body 14 is formed from two identical members 22 which are mounted in a parallel spaced relation by means of a number of spacer blocks 24 to form a laminated structure. The spaced relation of the members 22 increases the overall strength of the clasp to its box beam.

Each of the main body members 22 includes a rectangular base section 26 having the loop 18 at one end and a loop 28 at the other end. The loop 18 terminates at a spaced distance from the inside edge 30 of the base section 26 to form a gap 32 and the loop 28 terminates at the inside edge 30 of the body section 26. Two members 22 are assembled by placing them in a side-by-side relation with a number of spacer blocks 24 positioned between the members 22. The blocks 24 are secured to the member 22 by welding or any appropriate means to provide a space between the members 20. In an alternate arrangement, the main body can be formed by using only one of the members 22 and mounting the latch assembly on the full loop 28.

Means are provided on the loops 28 to connect the main body 14 to the chain 12. Such means is in the form of a ring 45 which is attached to a ring 34 provided at the end of the chain 12. In this regard, the chain can be welded directly to the base member without the loss of any tension in the body due to the heat of the weld. The other end of the chain 12 is provided with means in the form of a rectangular ring 36 which is mounted on the loop 18 by inserting one of the rings 36 through the gap 32. The ring 36 is pulled around the loop 18.

Figure 2:
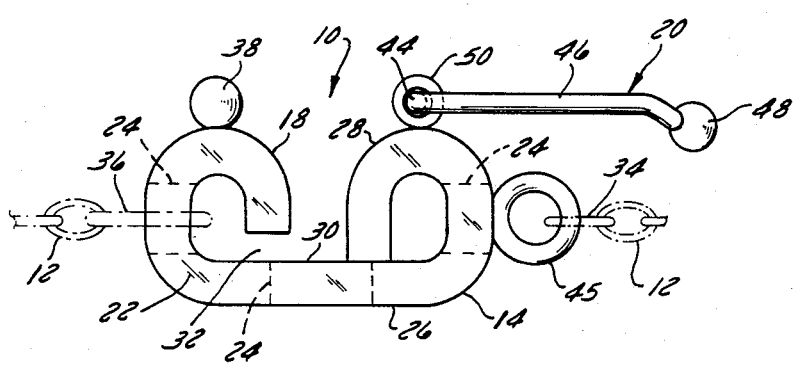
FIG. 2 is a side elevation of the jewelry clasp showing the latch in the open position.
Figure 3:
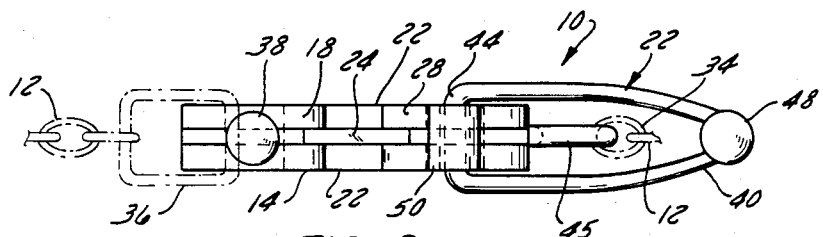
FIG. 3 is a top view of the clasp shown in FIG. 1.

The clasp is closed to prevent the ring 36 from coming off of the loop 18 by means of the latch assembly 20. In this regard and referring to FIG. 2, it will be noted that the latch assembly 20 includes a ball 38 and a detent member 40. The ball 38 is mounted on top of the loop 18.

The detent member 40 is formed from a small spring wire that is bent to form a triangular loop having a bight section 44 and a pair of side members 46. The side members 46 are joined at their outer end by means of a ball 48. The detent member 40 is pivotally supported on loops 28 by means of a hollow tube 50. The member 40 is assembled by inserting one end of the wire through the tube 50 until the bight section 44 is aligned therein. The end of the wire is then joined with the other end of the wire by means of a ball 48.

Figure 4:
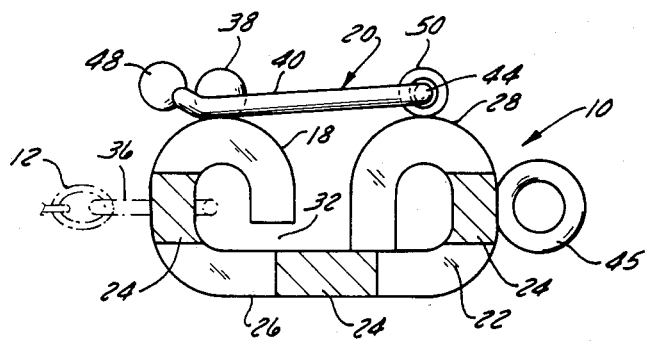
FIG. 4 is a side elevation view in section.
Figure 5:
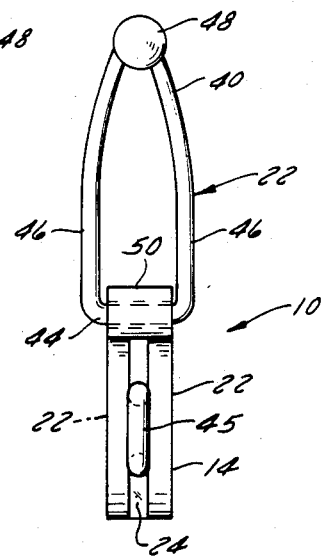
FIG. 5 is an end view of the clasp.

The member 40 is pivoted into engagement with the ball 38 to close the clasp. In this regard, it will be noted that the ball 38 has a diameter slightly greater than the distance between the two side members 46 of the triangular loop formed by the wire. The wire is snapped over the ball 38, as seen in FIG. 4, to lock the ring 36 on the loop 18. It should be noted that the ring 36 has an inside dimension large enough to pass over the ball 38 when the ring 36 is pulled over the loop 18. With this arrangement, even if the member 40 is released from the ball 38, the tension on the chain 12 will make it difficult for the ring 36 to come off of the loop 18.

The embodiments of the invention in which an exclusive property or privilege is claimed, are defined as follows:

1. A jewelry clasp comprising
   a main body having a loop at each end, one of said loops being open for detachable connection to a chain, and
   a latch assembly mounted on said main body for locking the chain on the open loop, said assembly including
   a ball mounted on said open loop, and
   a spring detent member mounted for pivotal movement on said other loop, said detent member being pivotal into engagement with said ball.

2. The clasp according to claim 1 wherein said main body includes
   a pair of identical sections, and
   means for supporting said sections in a parallel spaced relation.

3. The clasp according to claim 2 wherein said supporting means includes
   a number of spacer blocks positioned between said sections.

4. A jewelry clasp adapted for detachable connection to an end portion of a decorative necklace or bracelet chain, said clasp comprising
   a main body including a pair of base members, each base member including a closed loop at one end and an open loop at the other end, means for connecting said base members in a parallel spaced relation to form a laminated structure, means for connecting the closed loop on said base member to one end of the chain, said open loop being adapted for detachable connection to the other end of said chain, and lock means mounted on said base member for preventing the other end of said chain from disengaging from said open loop.

5. The clasp according to claim 4 wherein said lock means includes a triangular spring wire having a bight section and a pair of side members, said bight section being pivotally mounted on said closed loop, and a ball mounted on said open loop, said ball having a diameter greater than the distance between said side members whereby said spring wire is snapped over said ball to lock said end of said chain on said open loop.

6. A jewelry clasp for a necklace or bracelet chain, said clasp comprising a base member having an integral loop at each end, one of said loops being closed and the other of said loops being open for detachable connection to one end of the chain, and a latch assembly mounted on said base member for locking the end of the chain on said open loop, said latch assembly including a ball mounted on said open loop, and a spring wire member pivotally mounted on said closed loop, said spring wire member being rotatable into locking engagement with said ball member.

7. The clasp according to claim 6 wherein said base member includes two symmetrical sections mounted in a parallel spaced relation to form a laminated body member.

8. A jewelry clasp for a necklace or bracelet chain, said clasp comprising a single base member having a closed loop at one end and an open loop at the other end, said chain being connected to said closed loop and including means at one end for detachable connection to said open loop, and a latch assembly mounted on said base member for locking the detachable means on said open loop, said latch assembly including a ball mounted on said open loop, and a spring wire member mounted on said closed loop for pivotal movement into engagement with the ball.

* * * * *